(12) United States Patent
Haas et al.

(10) Patent No.: US 6,934,699 B1
(45) Date of Patent: Aug. 23, 2005

(54) SYSTEM AND METHOD FOR LOADING A CACHE WITH QUERY RESULTS

(75) Inventors: Laura Myers Haas, San Jose, CA (US); Donald Kossmann, Passau (DE); Ioana Mihaela Ursu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,190

(22) Filed: Sep. 1, 1999

(51) Int. Cl.⁷ .............................................. G06F 17/30
(52) U.S. Cl. ............................ 707/2; 707/3; 707/10; 707/104
(58) Field of Search ........................... 707/2, 10, 104, 707/3, 102, 100; 711/119, 122

(56) References Cited

U.S. PATENT DOCUMENTS

| | | | |
|---|---|---|---|
| 5,530,799 A | 6/1996 | Marsh et al. | 395/164 |
| 5,598,559 A * | 1/1997 | Chaudhuri | 707/2 |
| 5,615,362 A | 3/1997 | Jensen et al. | 395/614 |
| 5,668,987 A | 9/1997 | Schneider | 395/603 |
| 5,706,506 A | 1/1998 | Jensen et al. | 395/614 |
| 5,812,996 A | 9/1998 | Rubin et al. | 707/2 |
| 5,822,747 A * | 10/1998 | Graefe et al. | 707/2 |
| 5,822,749 A | 10/1998 | Agarwal | 707/2 |
| 5,897,634 A | 4/1999 | Attaluri et al. | 707/8 |
| 5,903,887 A * | 5/1999 | Kleewein et al. | 707/2 |
| 5,956,706 A * | 9/1999 | Carey et al. | 707/2 |
| 6,275,818 B1 * | 8/2001 | Subramanian et al. | 707/2 |

* cited by examiner

*Primary Examiner*—Jean M. Corrielus
(74) *Attorney, Agent, or Firm*—John L. Rogitz (57) ABSTRACT

A system and method for avoiding accessing a remote database twice, once during query execution and again to retrieve objects identified by the query, when an application requires objects on which to operate. During query plan generation in response to a request for database objects from an application, a query optimizer inserts cache operators into the candidate plans, and then a cost-benefit analysis is undertaken to identify the best plan. The best plan is then used to execute the query, with the cache operators causing objects identified during query execution to be cached locally to the requesting application as the query is being executed, thereby avoiding requiring the application to access the database after query execution.

18 Claims, 4 Drawing Sheets

OVERALL FLOW

FIG. 1
ARCHITECTURE

FIG. 2
OVERALL FLOW

FIG. 5
CHANGES TO OPTIMIZER

FIG. 6
OPTIMIZING QUERY

SYSTEM AND METHOD FOR LOADING A CACHE WITH QUERY RESULTS

BACKGROUND OF THE INVENTION

1. Field of the Invention

The present invention relates to facilitating the efficient querying of remote databases and subsequent use of query results by a querying application program.

2. Description of the Related Art

Relational database systems store large amounts of data, including business data that can be analyzed to support business decisions. For example, a relational database system can be used to store sales data including information on sales by time period, product, product line, geographic area, and so on, which can be usefully presented in response to a query to support a particular business decision. It will readily be appreciated that data can be presented in numerous ways to support a decision, depending on the particular decision (and, hence, query) being made.

Often, to generate information to support a decision or for other reasons an application program is invoked by a user, with the application program in turn querying a database query engine for data objects that the application program will require to support the user's purposes. In response, a query optimizer of the query engine generates an efficient query plan, and then the query engine accesses the database in accordance with the query plan. In executing the query, it is frequently the case that a large amount of data must be processed.

In executing the query plan, the query engine determines which columns from which database tables to read, and then if necessary buffers the columns to support query execution. After query execution, the buffer typically is emptied and a results set is returned to the application program. The results set ordinarily includes identifications of objects, referred to by the shorthand term of ".oid", that satisfy the query. Using the results set, the application program then requests the objects from the database using the .oid set returned by the query engine. Accordingly, the skilled artisan will recognize that the database is accessed twice for data—once by the query engine, and subsequently by the application program to retrieve the objects identified by the query engine.

The application program and database query engine can be local to the user computer, or they can be implemented by so-called "middleware" with which the user computer communicates via a computer network, such as a local area network (LAN) or wide area network (WAN). In any event, the database itself has in the past been locally accessible to the application program and query engine, rendering the necessity of having to access the database twice somewhat inconsequential, even for data-intensive database query operations.

As recognized by the present invention, however, databases increasingly are remote from query execution and application execution "middleware". For example, many databases on the world wide web are now accessible via the Internet. Because the data transfer rates of wide area networks such as the Internet are relatively low, accessing remote databases is relatively expensive. Indeed, accessing remote databases twice for a single operation can lead to unacceptably long delays, and in the context of data-intensive query processing and application execution, can be disastrously long. The present invention has recognized the above-noted problem and has provided the solution set forth below.

SUMMARY OF THE INVENTION

A general purpose computer is programmed according to the inventive steps herein to locally cache, during query execution, objects identified as a result of the query execution, for subsequent use of the objects by an application program. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

A database is remote from the computer and is accessible thereto, and logic is executable by the computer for receiving a query request and, in response to the query request, accessing the database. The logic also includes retrieving object data from the database to execute a query. During the retrieving act, objects from the database are stored in the local cache, such that the objects in the local cache subsequently can be accessed using the application program.

In a preferred embodiment, the logic executed by the computer includes generating at least one query plan in response to the query request. As intended herein, the query plan includes at least one query execution operator, with the query plan being characterizable by a plan tree defining a top and a bottom. At least one cache operator is then inserted into the query plan. As disclosed in detail below, the cache operator includes a first parameter specifying objects in an input stream to the cache operator to be copied into the cache and a second parameter specifying which data attributes to be passed through to a next operator in the query plan. Preferably, for at least some query plans, a cost and a benefit of including at least one cache operator in the plans is determined. Furthermore, a plan is selected to be executed, based on the cost/benefit analysis.

In one cache operator placement embodiment, in at least one plan a cache operator is placed high in the plan relative to the respective plan tree. In this embodiment, the cache operator is pushed down in the plan relative to the respective plan tree through at least one non-reductive query operator. In another embodiment, a cache operator is placed low in the plan relative to the respective plan tree, and the cache operator is moved up in the plan relative to the respective plan tree through at least one of: a leaf query operator, and a pipelining operator.

In still a third cache operator placement embodiment, the logic includes identifying at least one candidate collection of objects in at least one query plan and then, for at least a portion of a candidate collection, inserting a cache operator for the portion above the plan relative to the respective plan tree. A cost/benefit estimation is then performed, and plans are pruned as a result. As envisioned herein, the cost of a cache operator of a plan is defined to be proportional to a cardinality of an input stream to the plan. In contrast, the benefit of a cache operator of a plan is defined to be proportional to a minimum of: the cardinality, an output having a most selective local predicate, and an output having a most selective join predicate.

In another aspect, a computer-implemented method includes receiving, from a local application program, a query request for objects stored in a remote database. A local cache is accessible to the local application program. The method also includes storing objects in the local cache while executing a query in response to the query request. Moreover, the method includes accessing the objects in the local cache using the application program. With this inventive method, the application program is not required to access the database to retrieve the objects after query execution.

In still another aspect, a computer program device includes a computer program storage device readable by a digital processing apparatus, and a program on the program storage device. The program includes instructions that can be executed by the digital processing apparatus for performing method acts for caching objects in accordance with query results during query execution. As set forth further below, the program includes computer readable code means for receiving a request for objects from an application program at a local computer site, it being understood that the objects are stored in a database remote from the local site. Computer readable code means generate at least one query plan to identify objects in the database satisfying the request, and then means execute the query plan. Additionally, code means cause at least some objects identified by the means for executing to be copied into a cache at the local computer site contemporaneously with the executing step undertaken by the means for executing. Consequently, the application program can access the objects in the cache without accessing the database after the query plan is executed.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
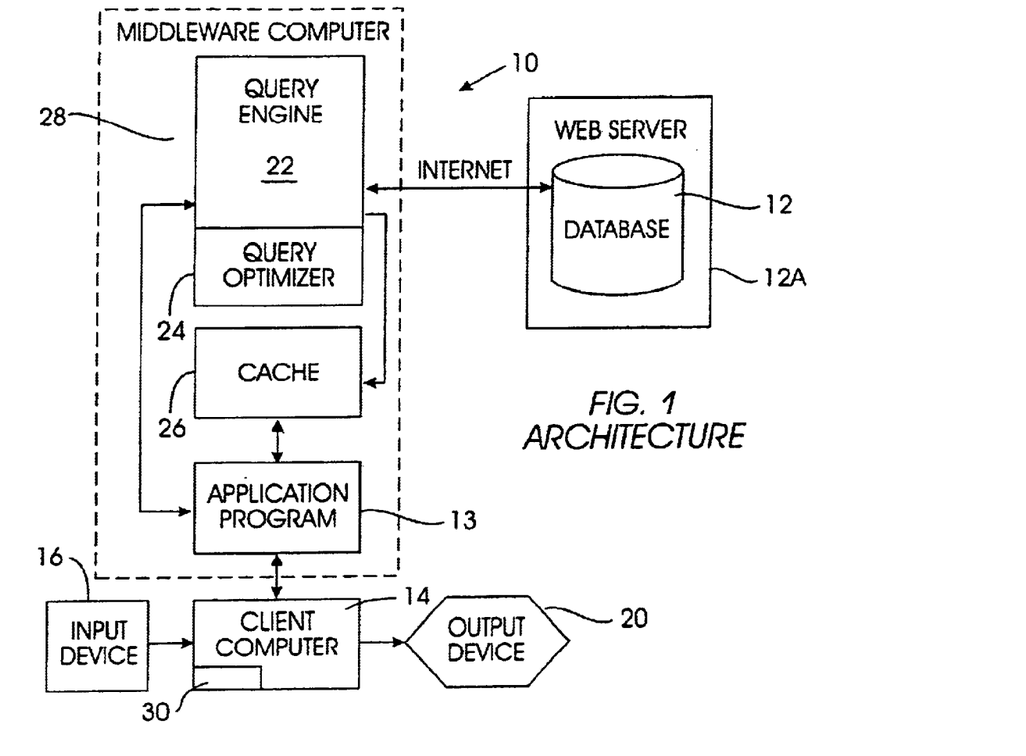
FIG. 1 is a schematic diagram showing the system of the present invention.

Referring initially to FIG. 1, a system is shown, generally designated 10, for caching query results from a database 12 during query execution for subsequent use of the results by an application program 13 that is remote from the database 12 and that is accessible by a client or user computer 14. The database 12 may reside, for example, in a Web server 12A or other location remote from the user computer 14 and be accessible via a wide area network, such as but not limited to the Internet. In one intended embodiment, the computer 14 may be a personal computer made by International Business Machines Corporation (IBM) of Armonk, N.Y., or the computer 14 may be any computer, including computers sold under trademarks such as AS400, with accompanying IBM Network Stations. Or, the computer 14 may be a Unix computer, or OS/2 server, or Windows NT server, or IBM RS/6000 250 workstation or an IBM laptop computer.

As shown in FIG. 1, the computer 14 is electrically connected to one or more input devices 16, e.g., a mouse or keyboard, which can be manipulated by a user of the system 10 to generate requests for the application program 13 to execute a program requiring data objects from the database 12. The results of the application execution can be output via an output device 20 such as a printer or monitor that are conventionally coupled to the computer 14.

In accordance with the present invention, associated with the application program 13 is a query engine 22 with query optimizer 24 for determining how to efficiently retrieve the requested data, based on user-defined predicates. In accordance with the present logic, the query optimizer 24 generates candidate query plans in response to a request for database objects from the application program 13, and then evaluates the candidates to select a best plan. The best plan is then used by the query engine 22 to execute the query on the database 12. As intended herein, during query execution objects from the database 12 that satisfy the query are copied into a cache 26, for access and use of the objects by the application program 13.

As shown in FIG. 1, in one intended embodiment the application program 13, cache 26, and query engine 22 are hosted on a single local site, such as a so-called "middleware" computer 28 or on a server computer, with the client computer 14 being separate from but in communication with the middleware computer 28. Alternatively, the client computer 14 can be integrated into the middleware computer 28. In any case, the database 12 is remote from the application program 13, query engine 22, and cache 26 as shown.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program such as the application program 13 and/or query engine 22 with optimizer 24 that are executed by a processor within the computer 14 as a series of computer-executable instructions. These instructions may reside, for example, in RAM of the computer 14 or on a hard drive 30 or optical drive of the computer 14, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Figure 2:
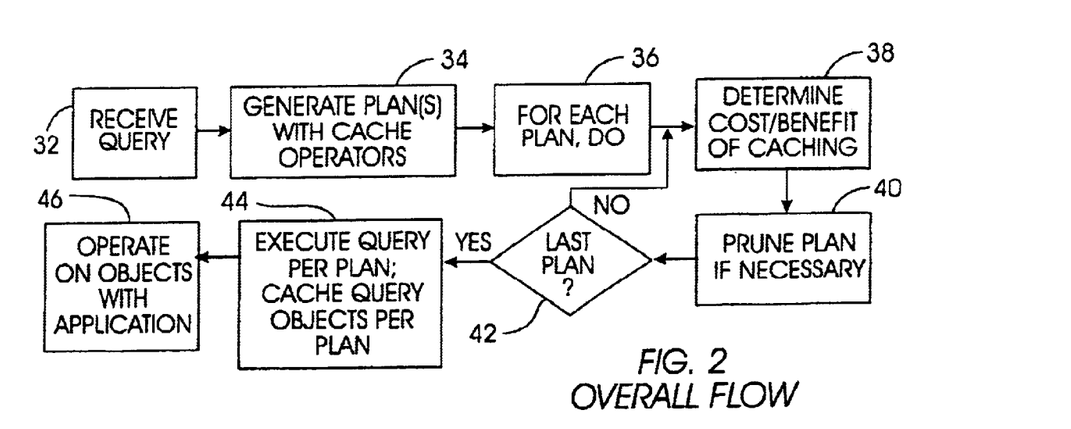
FIG. 2 is a flow chart showing the overall steps of the present logic.

Now referring to FIG. 2, the overall steps of the present logic can be seen. Commencing at block 32, a query is received by the query engine 22 from the application program 13 in response to a user desire for information as indicated by appropriate input from the input device 16. Then, at block 34 the query optimizer 24 generates candidate query plans with cache operators placed in the plans in accordance with the logic disclosed below. Proceeding to block 36, a DO loop is entered for the candidate query plans. At block 38 of the DO loop, a cost and benefit of each plan is determined, and at block 40 the plan under test is pruned as necessary based on the cost/benefit determination at block 38.

If it is determined at decision diamond 42 that the last candidate plan has not been tested, the DO loop continues by looping back to block 38 for the next plan. Otherwise, the DO loop exits to block 44, wherein the query is executed in accordance with the best one of the plans as determined by the cost/benefit analysis of block 38. This cost/benefit analysis can entail conventional cost/benefit analysis undertaken by query optimizers as well as the cache operator analysis shown further below.

During execution of the query, objects that satisfy the query are stored in the local cache 26, and are not automatically discarded after the query results (typically, a list of objects by oid) are generated, in contrast to conventional database query buffering operations. Consequently, the logic can move to block 46 to operate on the objects using the application 13, without resorting to a second (i.e., post-query) access of the remote database 12.

FIGS. 3–6 show the details of three alternative methods used by the query optimizer 24 for inserting cache operators into query plans to cause objects to be copied to the local cache 26 during query execution. Starting at block 48 of FIG. 3, the select clause of the query is rewritten to replace all occurrences of "oid" ("object identification") with a filler asterisk that indicates that all columns of that collection of objects should be selected. This recognizes that, since most applications generally require entire objects, caching only portions of objects is not as useful as caching entire objects. The query is optimized conventionally at block 50.

Figure 3:
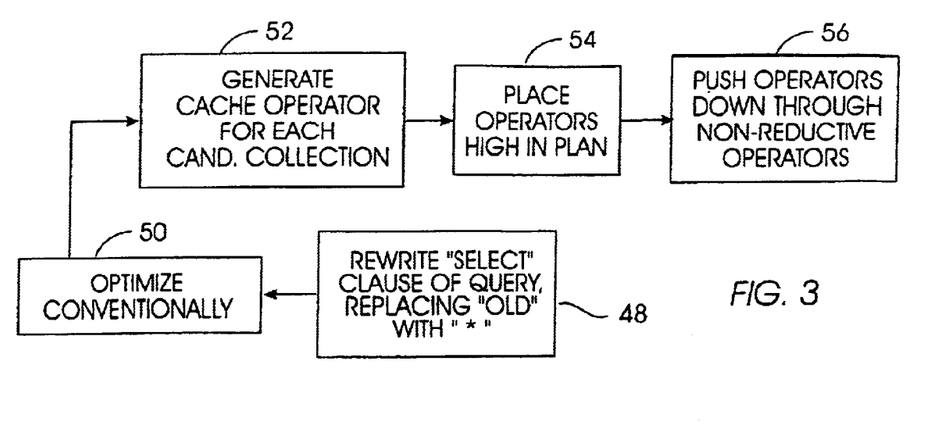
FIG. 3 is a flow chart showing the logic for a first heuristic approach to inserting cache operators in query plans.

Proceeding to block 52, cache operators are generated for each candidate collection in the plan. By "candidate collection" is meant a collection of objects the oids of which are returned as part of the query result, i.e., objects whose oid columns are part of the query's SELECT clause.

In accordance with the present invention, each cache operator generated at block 52 has two parameters. One parameter specifies which objects of the input stream (i.e., the data input to the cache operator based on the position of the cache operator in the plan) to copy into the local cache 26. A second parameter of a cache operator specifies which columns of the input stream to the operator should be passed through to the next operator in the plan, i.e., which columns should not be projected out of the plan. Accordingly, while a cache operator causes entire objects to be copied to cache, the cache operator, for query execution purposes, also identifies which columns of objects are needed for the next query operator in the query plan.

Figure 8:
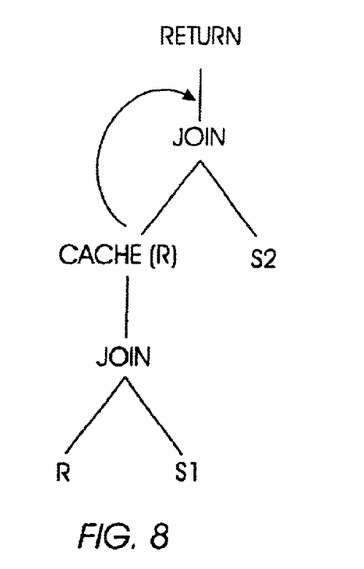
FIG. 8 is a graph of an exemplary query plan.

Proceeding from block 52 to block 54, in the embodiment shown in FIG. 3, cache operators, after being generated, are placed high in a candidate query plan at block 54. To better understand the logic of FIG. 3, brief reference is made to FIG. 8, which shows a graph of an exemplary query plan. As shown, the graph can be represented in a tree-like structure having bottom-most leaf nodes, designated R and S1, query operators such as the labelled joins, and cache operators such as the cache operator labelled "cache (R)", with the graph defining a top "return" node. In the example shown, the nodes R, S1, and S2 represent tables of data, the connecting lines represent join predicates, and the cache operator labelled "cache (R)" represents an operator for caching objects from the table R. Accordingly, in the example shown and in accordance with the above disclosure, the cache operator has been inserted at the location shown after having determined that objects from the table R constitute a candidate collection.

After placing the cache operators in the candidate plan as discussed, the query optimizer 24 moves to block 56 to push cache operators down through the tree-like structure of the query graph below non-reductive operators. Cache operators are not pushed down below reductive operators, however. As intended by the present invention, a non-reductive operator is an operator that does not filter out any objects, such as a sort operator and certain functional joins for which integrity constraints guarantee that all objects satisfy the join predicate. A formal definition of non-reductive predicates is set forth in Carey et al., "On Saying Enough Already in SQL", *Proc. of the ACM SIGMOD Conf. on Management of Data*, pp. 219–230, May, 1997.

It is to be appreciated that the logic shown in FIG. 3 is based on the principle that all relevant objects should be cached and no irrelevant objects should be cached. Further, it is to be appreciated that the push-down step of block 56 reduces the cost of the query. For example, suppose a cache operator is pushed down below a sort query operator. The cost of the sort is reduced because the sort operator works on "thin" tuples, i.e., tuples having had projected out (by the cache operator) those columns that are not needed for the sort but that might have been added as a result of the rewrite step at block 48. At the same time, no irrelevant objects are copied into the cache.

Figure 4:
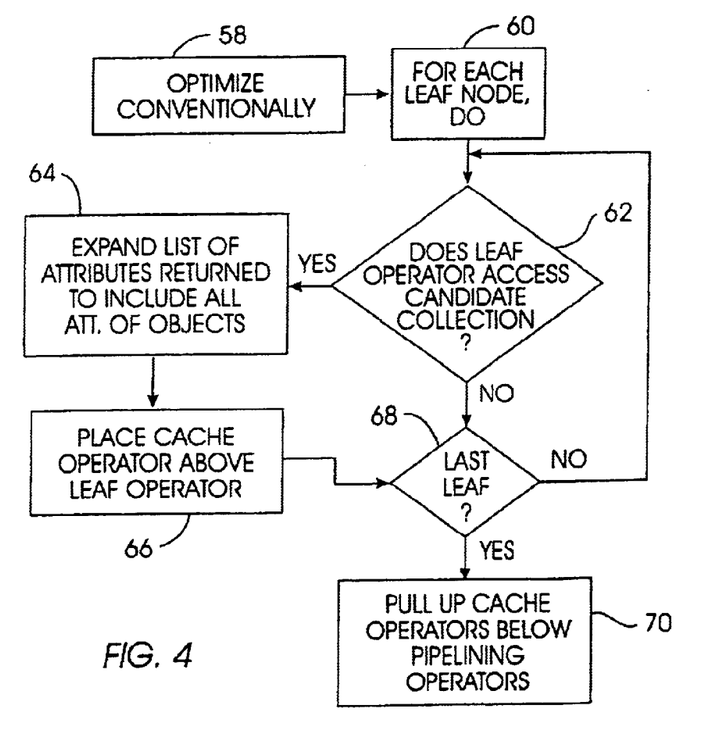
FIG. 4 is a flow chart showing the logic for a second heuristic approach to inserting cache operators in query plans.

FIG. 4 shows a second cache operator placement method. At block 58, query plans are optimized conventionally, and then at block 60, a DO loop is entered for each leaf node of the plan. At decision diamond 62 of the DO loop, it is determined whether a leaf operator accesses a candidate collection. If it does, the logic moves to block 64 to expand the list of attributes returned from the candidate collection to include the attributes of all objects, recalling that it is desirable to cache entire objects, not just parts of them. Next, at block 66 a cache operator is placed just above the leaf operator under test.

From block 66, or from decision diamond 62 if the leaf operator under test does not access a candidate collection, the logic moves to decision diamond 68 to determine whether the DO loop is at an end. If it is not the logic loops back to decision diamond 62 to process the next leaf node. In contrast, after all leaf nodes have been processed the logic exits the DO loop at block 70, wherein cache operators inserted at block 66 are pulled up through the tree-like query graph past so-called "pipelining" operators such as filters or nested-loop joins to thereby reduce the number of false cache insertions without increasing the cost of the query.

As understood herein, while both FIGS. 3 and 4 illustrate useful logic, the logic of FIGS. 3 and 4 assume that the extra cost incurred by plans with cache operators is always outweighed by the benefits of caching for future application use. The present invention observes that under some circumstances, the logic shown in FIGS. 5–7 can improve system performance by estimating costs and benefits for various cache operator placement proposals generated by the query optimizer 24.

Commencing at block 72 in FIG. 5, the query optimizer 24 is modified for undertaking the logic shown in FIGS. 6 and 7 as follows. As an example, assume that query optimizer 24 is modified from a so-called bottom-up dynamic programming optimizer as described in, e.g., Selinger et al., "Access Path Selection in a Relational Database System", *Proc. of the ACM SIGMOD Conf. on Management of Data*, pp. 23–34, May 1979. Such an optimizer generates candidate query plans in three phases, first by planning for single collection accesses, second by planning for joins, and then by adding operators for aggregation, ordering, unions, etc. Along the way a set of plan properties is kept recording what has been done to generate the plan. At the end of each of the above-described phases the optimizer prunes, i.e., eliminates, all but the least expensive plans.

With the above in mind, at block 72 the effect of cache operators on a plan's properties is defined in accordance with the above-disclosed cache operator parameters. Next, at blocks 74 and 76 the above-mentioned first and second phases are respectively modified such that some alternate plans are generated at each phase with cache operators. In some dynamic programming optimizers, each of the steps at blocks 74 and 76 require adding a rule to the optimizer. Also, in the modification to the access phase at block 74 the new rule generates some plans for getting all attributes of the objects in the collection (thereby rendering so-called "thick" plans) if the collection is one whose oid column is selected by the query, i.e., is a candidate collection. And, the rule generates extra plans having a cache operator placed above each thick plan. Likewise, in the join planning phase modification at block 76, cache operators are caused to be added on top of each round of joining.

It will readily be appreciated that many candidate plans having cache operators, in addition to conventionally-generated plans having no cache operators, can be generated by the optimizer 24 as a result of the above modifications. Accordingly, at block 78 the optimizer 24 is modified to undertake the below-described cost/benefit analysis for caching plans, in addition to its conventional cost/benefit analysis. Next, at block 80 the optimizer 24 is modified to prune expensive plans generated by the above process.

Figure 5:
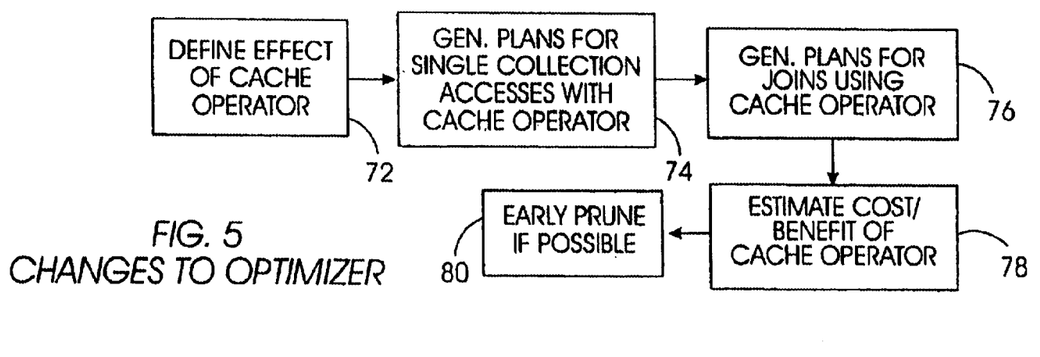
FIG. 5 is a flow chart showing the logic for modifying a query optimizer to account for cache operators.
Figure 6:
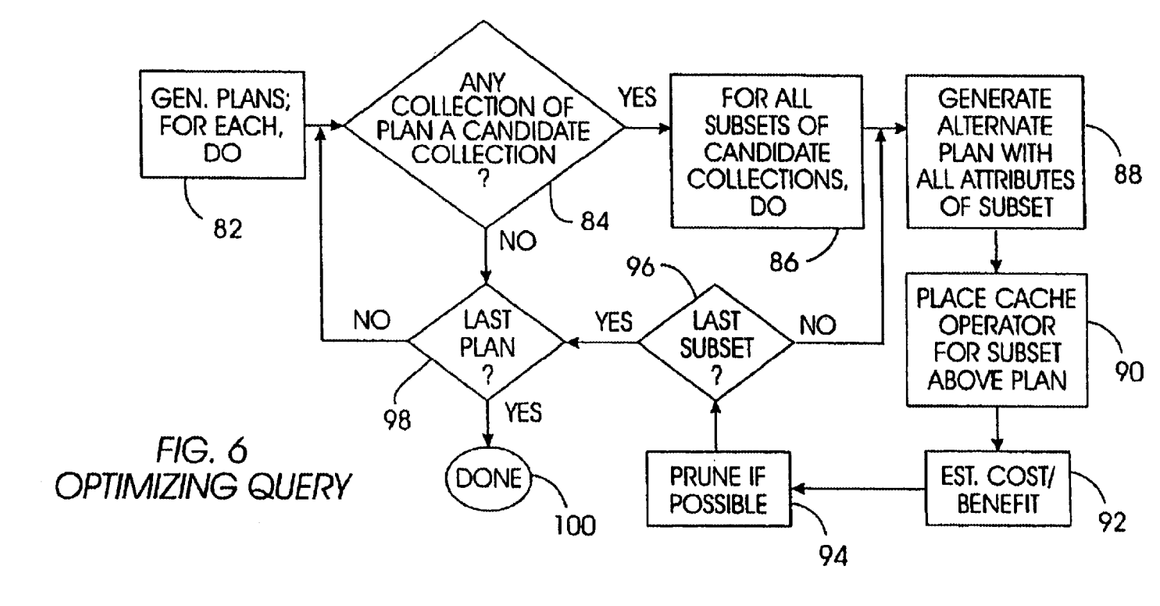
FIG. 6 is a flow chart showing the logic used by a query optimizer modified in accordance with FIG. 5 to optimally insert cache operators in query plans.

FIG. 6 shows the logic by which an optimizer modified in accordance with FIG. 5 can insert cache operators into query plans. Commencing at block 82, candidate query plans are conventionally generated and a DO loop is entered for each. Proceeding to decision diamond 84, for the plan under test it is determined whether any collection of the plan is a candidate collection. If it is, the logic moves to block 86 to enter a nested DO loop for all subsets of candidate collections. Proceeding to block 88, an alternate plan is generated having all attributes of the subset. From block 88 the logic moves to block 90 to place a cache operator for each subset above the alternate plan. Then, a cost/benefit analysis is undertaken at block 92 in accordance with the logic shown in FIG. 7.

After determining costs and benefits of the alternate plans, the logic moves to block 94 to prune expensive plans, if possible. In accordance with present principles, a plan is pruned if it is at least as expensive as some other plan that has equivalent or more general properties, with the survivors thus being either alternative (caching) plans or non-caching original plan. Ordinarily, a thick plan will be more general than a thin plan (and hence not be pruned in favor a similarly expensive thin plan), but under the following conditions a thick plan can be pruned in favor of a thin plan:

$Cost_{thin} \leq Cost_{thick} + Cost_{cachebest}$–Benefit, where $Cost_{thin}$=cost of the thin plan, $Cost_{thick}$=cost of the thick plan, $Cost_{cachebest}$=minimum actual cost incurred to cache a collection, corresponding to the case wherein a cache operator is located directly above that join that results in the minimum number of output tuples from the collection, and Benefit is the benefit of caching as defined below. The above condition essentially represents the situation wherein the minimal possible cost for caching is more than the cost of the thin plan. Accordingly, under these conditions there is no point in keeping the thick plan, because caching is not a cost-effective operation.

Decision diamond 96 represents a test for determining whether the last subset of the candidate collections of the plan under test has been tested, and if not, the nested DO loop returns to block 88 with the next subset. When the nested DO loop for the plan under test is completed, the logic moves from decision diamond 96 to decision diamond 98 to determine whether the DO loop for the plans has been completed. If not, the DO loop returns to decision diamond 84 with the next plan; otherwise, the logic ends at state 100.

Figure 7:
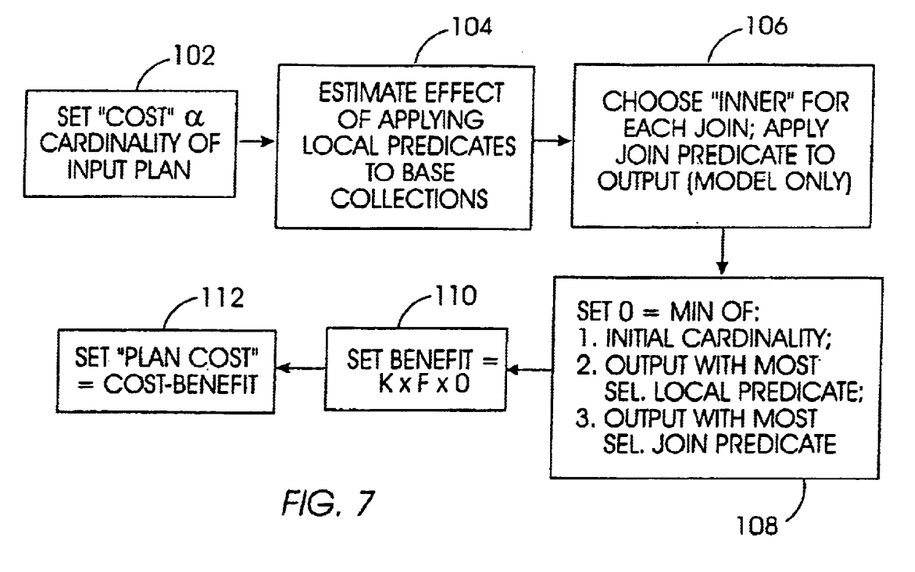
FIG. 7 is a flow chart showing the logic for determining costs and benefits of using cache operators in a query plan.

Now referring to FIG. 7, the logic by which a cost/benefit analysis of a caching plan is made can be seen. Commencing at block 102 the cost of each cache operator in the plan is set to be proportional to the cardinality of the input to that cache operator, representing the time to copy objects into cache and project columns from the output stream.

In contrast, estimating the benefit of the cache operators of a plan is somewhat more involved. At block 104 of the preferred embodiment the effect of applying local predicates to base conditions is estimated using conventional optimizer formulae. Proceeding to block 106, an inner is chosen for each join in the plan and then the optimizer 24 "applies" the join predicate to the inner join's output. Importantly, the optimizer models the joins and does not actually build plans.

From block 106, the logic moves to block 108 to set a variable "O", representing the output of each candidate collection for the query, to be equal to the minimum of one of three values: the initial cardinality of the input stream, the output of a collection after applying the most selective local predicate (i.e., non-join predicates that are specific to a particular collection), and the output of the collection after applying the most selective join predicate. Next, at block 110 the benefit is set equal to the product of O, F, and k, where F=an assumed fraction of objects in the query result (e.g., 80%), and k represents the time to fault in a non-cached object to the cache 26 from the database 12. The costs and benefits of the cache operators determined above are then added to conventionally-determined plan costs and benefits to find the best plan.

While the particular SYSTEM AND METHOD FOR LOADING A CACHE WITH QUERY RESULTS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer-implemented method, comprising:

receiving, from a local application program, a query request for objects stored in a remote database, a local cache being accessible to the local application program;

storing objects in the local cache while executing a query in response to the query request;

accessing the objects in the local cache using the local application program, whereby the application program is not required to access the database to retrieve the objects after query execution;

generating at least one query plan in response to the query request, wherein the query plan includes at least one query execution operator, the query plan being characterizable by a plan tree defining top and bottom; and establishing at least one cache operator for the query plan, the cache operator including a first parameter specifying objects in an input stream to the operator to be copied into the cache and a second parameter specifying which data attributes to be passed through to a next operator in the query plan.

2. The method of claim 1, further comprising:

for at least some query plans, determining a cost and a benefit of including at least one cache operator in the plans; and selecting a plan to execute, based on the act of determining a cost and a benefit.

3. The method of claim 2, further comprising:

identifying at least one candidate collection of objects in at least one query plan;

for at least a candidate collection, inserting a cache operator for the collection above the plan relative to the respective plan tree; and estimating a cost and a benefit of the query plan after placement of the cache operator.

4. The method of claim 3, further comprising pruning a query plan based at least in part on the estimating act.

5. The method of claim 3, wherein the estimating act further comprises:

defining a cost of a cache operator of a plan to be proportional to a cardinality of an input stream to the plan; and defining a benefit of a cache operator of a plan to be proportional to a minimum of:

the cardinality, an output having a most selective local predicate, and an output having a most selective join predicate.

6. The method of claim 1, wherein at least one plan is generated by placing a cache operator high in the plan relative to the respective plan tree.

7. The method of claim 6, wherein the method acts undertaken by the computer include moving at least one cache operator down in the plan relative to the respective plan tree through at least one non-reductive query operator.

8. The method of claim 1, wherein at least one plan is generated by placing a cache operator low in the plan relative to the respective plan tree.

9. The method of claim 8, further comprising selectively moving at least one cache operator up in the plan relative to the respective plan tree through at least one of: a leaf query operator, and a pipelining operator.

10. A computer program device, comprising:

computer program storage device readable by a digital processing apparatus; and a program on the program storage device and including instructions executions executable by the digital processing apparatus for performing method acts for caching objects in accordance with query results during query execution, the program comprising:

computer readable code means for receiving a query request for object from and application at a local computer site, the objects being stored in a database remote from the local site;

computer readable code means for generating at least one query plan to identify objects in the database satisfying the request;

computer readable code means for executing the query plan, wherein the query plan includes at least one query execution operator, the query plan being characterizable by a plan tree defining top and a bottom;

computer readable code means for causing at least some objects identified by the means for executing to be copied into a cache at the local computer site contemporaneously with the executing step undertaken by the means for executing, whereby the application program can access the objects in the cache without accessing the database after the query is executed; and computer readable code means for establishing at least one cache operator for the query plan, the cache operator including a first parameter specifying objects in an input stream to the operator to be copied into the cache and a second parameter specifying which data attributes to be passed through to a next operator in the query plan.

11. The device of claim 10, comprising:

computer readable code means for determining, for at least some query plans, a cost and a benefit of including at least one cache operator in the plans; and computer readable code means for selecting a plan to execute, based on the means for determining a cost and a benefit.

12. The device of claim 11, further comprising:

computer readable code means for identifying at least one candidate collection of objects in at least one query plan;

computer readable code means for inserting, for at least a candidate collection, a cache operator for the collection above the plan relative to the respective plan tree; and computer readable code means for estimating a cost and a benefit of the query plan after placement of the cache operator.

13. The device of claim 12, further comprising computer readable code means for pruning a query plan based at least in part on the means for estimating.

14. The device of claim 12, wherein the means for estimating further comprises:

computer readable code means for defining a cost of a cache operator of a plan to be proportional to a cardinality of an input stream to the plan; and computer readable code means for defining a benefit of a cache operator a plan to be proportional to a minimum of: the cardinality, an output having a most selective local predicate, and an output having a most selective join predicate.

15. The device of claim 10, wherein at least one plan is generated by placing a cache operator high in the plan relative to the respective plan tree.

16. The device of claim 15, wherein device include computer readable code means for moving at least one cache operator down in the plan relative to the respective plan tree through at least one non-reductive query operator.

17. The device of claim 10, wherein at least one plan is generated by placing a cache operator low in the plan relative to the respective plan tree.

18. The device of claim 17, wherein the device further includes computer readable code means for selectively moving at least one cache operator up in the plan relative to the respective plan tree through at least one of: a leaf query operator, and a pipelining operator.

* * * * *